(12) United States Patent
Lonka et al.

(10) Patent No.: US 7,519,404 B2
(45) Date of Patent: *Apr. 14, 2009

(54) TELESCOPIC TELEPHONE

(75) Inventors: Pekka Lonka, Salo (FI); Mikael Kontkanen, Salo (FI)

(73) Assignee: Nokia Corporation, Espoo (FI)

( * ) Notice: Subject to any disclaimer, the term of this patent is extended or adjusted under 35 U.S.C. 154(b) by 684 days.

This patent is subject to a terminal disclaimer.

(21) Appl. No.: 11/175,710

(22) Filed: Jul. 6, 2005

(65) Prior Publication Data

US 2005/0265545 A1    Dec. 1, 2005

Related U.S. Application Data

(63) Continuation of application No. 09/268,080, filed on Mar. 12, 1999, now Pat. No. 6,961,593.

(30) Foreign Application Priority Data

Mar. 18, 1998   (FI) ...................................... 980602

(51) Int. Cl.
    *H04M 1/00*    (2006.01)
(52) U.S. Cl. ................... 455/575.4; 455/90.3; 455/128; 379/433.12
(58) Field of Classification Search ................ 455/90.1, 455/90.3, 128, 550.1, 575.1, 575.3, 575.4; 379/433.01–433.04, 433.11, 433.12
    See application file for complete search history.

(56) References Cited

U.S. PATENT DOCUMENTS

| | | | |
|---|---|---|---|
| 5,151,946 A * | 9/1992 | Martensson ............... 455/575.4 |
| 5,170,173 A | 12/1992 | Krenz et al. ................ 343/702 |
| 5,251,329 A | 10/1993 | Takagi et al. ................ 455/575 |
| 5,260,998 A | 11/1993 | Takagi |
| 5,440,629 A | 8/1995 | Gray ........................... 379/433 |
| 5,485,517 A | 1/1996 | Gray ........................... 379/433 |
| 5,615,260 A | 3/1997 | Kurgan |
| 5,636,275 A | 6/1997 | Takagi et al. |
| 5,657,370 A | 8/1997 | Tsugane et al. ............. 455/550 |
| 5,835,006 A | 11/1998 | Michalak et al. |
| 5,907,615 A | 5/1999 | Kaschke ...................... 379/433 |
| 5,918,189 A | 6/1999 | Kivela ......................... 455/575 |
| 5,956,625 A | 9/1999 | Hansen et al. ................ 455/90 |
| 5,995,809 A | 11/1999 | Kobayashi ................... 455/90 |

(Continued)

FOREIGN PATENT DOCUMENTS

EP     0414365 A    2/1991

(Continued)

OTHER PUBLICATIONS

Patent Abstracts of Japan, JP 05-183616, Jul. 23, 1993.

(Continued)

*Primary Examiner*—Nhan T Le
(74) *Attorney, Agent, or Firm*—Perman & Green, LLP (57) ABSTRACT

A telephone comprises a first part (601) and a second part (602) attached thereto, said second part being movable in relation to the first part between a first position and a second position. The telephone further comprises in the first part a radio transmitter/receiver (604) and a connected antenna (603), and in the second part an arrangement for attaching the battery (610) to the second part.

11 Claims, 6 Drawing Sheets

U.S. PATENT DOCUMENTS

| | | | | |
|---|---|---|---|---|
| 6,002,946 | A | 12/1999 | Reber et al. | 455/557 |
| 6,011,699 | A | 1/2000 | Murray et al. | 361/814 |
| 6,018,671 | A | 1/2000 | Bremer | 455/567 |
| 6,038,313 | A | 3/2000 | Collins | 379/433 |
| 6,064,734 | A | 5/2000 | Hasegawa et al. | 379/433 |
| 6,118,986 | A | 9/2000 | Harris et al. | 455/575 |
| 6,128,475 | A * | 10/2000 | Wicks et al. | 455/575.4 |
| 6,151,485 | A * | 11/2000 | Crisp | 455/575.4 |
| 6,151,486 | A | 11/2000 | Holshouser et al. | 455/90 |
| 6,208,874 | B1 | 3/2001 | Rudisill et al. | 455/550 |
| 6,535,749 | B1 * | 3/2003 | Iwata et al. | 455/556.2 |
| 6,647,249 | B1 * | 11/2003 | Crisp | 455/575.4 |
| 6,961,593 | B1 * | 11/2005 | Lonka et al. | 455/573 |
| 6,993,128 | B2 * | 1/2006 | Eromaki | 379/433.12 |
| 7,010,327 | B1 * | 3/2006 | Griffith et al. | 455/564 |
| 7,209,772 | B2 * | 4/2007 | Crisp | 455/575.4 |

FOREIGN PATENT DOCUMENTS

| | | |
|---|---|---|
| EP | 0501820 A | 9/1992 |
| EP | 94109993.0 | 6/1994 |
| EP | 0631416 A | 12/1994 |
| EP | 0658030 A1 | 6/1995 |
| EP | 0720339 A2 | 7/1996 |
| EP | 0796026 A2 | 9/1997 |
| EP | 0796026 A2 | 9/1997 |
| EP | 0802659 A1 | 10/1997 |
| EP | 0802659 A1 | 10/1997 |
| EP | 92301719.8 | 2/2002 |
| WO | SE96/00992 | 8/1996 |
| WO | DE 19520947 A1 | 12/1996 |
| WO | 97/42746 A1 | 11/1997 |
| WO | WO 97/42746 | 11/1997 |

OTHER PUBLICATIONS

Patent Abstracts of Japan, JP 10-243065, Sep. 11, 1998.
Patent Abstracts of Japan, JP 08-186517, Jul. 16, 1996.
Patent Abstracts of Japan, JP 07-291013, Nov. 7, 1995.
Patent Abstracts of Japan, JP 06-037697, Feb. 10, 1994.
Translation of Japanese Office Action dated Nov. 26, 2007, Japanese Application H11-074157.

* cited by examiner

TELESCOPIC TELEPHONE

CROSS-REFERENCE TO RELATED APPLICATIONS

This application is a continuation of and claims priority from U.S. patent application Ser. No. 09/268,080, filed on Mar. 12, 1999 now U.S. Pat. No. 6,961,593.

TECHNOLOGICAL FIELD

In general, the invention relates to the electric and mechanical structure of telephones. In particular, the invention relates to the structure of a telescopically expanding telephone and to the location of its elements. The term telephone here means any hand-held apparatus designed for radio communications and provided with a microphone and a loudspeaker. By way of example, we shall here discuss a mobile phone.

BACKGROUND OF THE INVENTION

Mobile phones are attempted to be made as small as possible in order to make them easily transportable in pockets or handbags. This tendency is, however, controversial to the feasibility of the telephone; because the user interface, i.e. mainly the keyboard and the display, must be made so small that on the display screen, there is room for limited information only (or the information must be shown on the screen with unreasonably small characters), and the keys and the spaces between them are unreasonably small for the fingers of an adult user. As a solution, there are suggested various folding telephones.

FIGS. 1-4 illustrate various prior art solutions designed mainly in order to enlarge the user interface of a small-size telephone. The mobile phone 100 illustrated in FIG. 1 comprises a housing 101 and a turning arm 102 attached to the side of the housing by means of a rotating joint. The loudspeaker 103 is provided in the housing 101, and the microphone 104 is located at the end of the turning arm 102. In preparation for use, the turning arm 102 is turned to a position illustrated by a uniform line in the drawing, and during transport it is turned to a position at the side of the housing 101, illustrated by a dotted line. The mobile phone 200 illustrated in FIG. 2 comprises a housing 201 and a flap 202 attached by a hinge at the bottom edge of the housing. In the transport position, the flap 202 covers the keyboard 203, and in preparation for use, the flap 202 is turned to the position illustrated in FIG. 2, so that the microphone 204 provided at the outer end of said flap 202 comes near to the user's mouth in the regular usage position. The regular usage position means that the user holds the telephone in his hand, so that the loudspeaker 205 is pressed against his ear and the flap 202 points more or less towards his chin.

Figure 3:
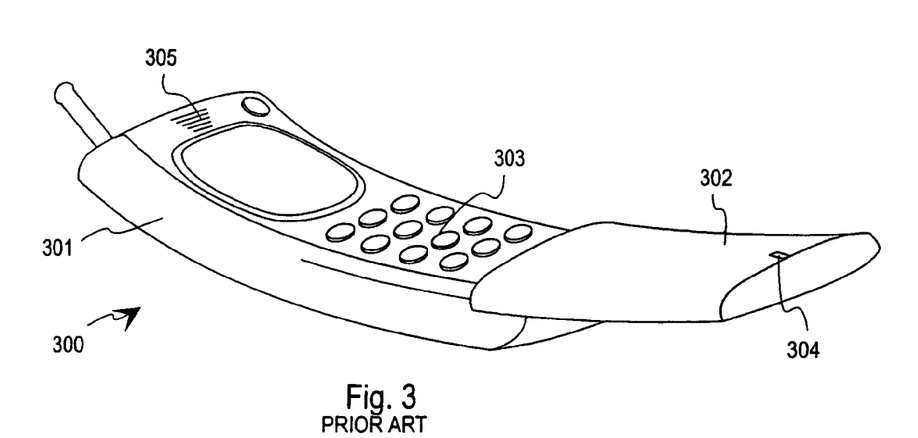
FIG. 3 illustrates a third prior art mobile phone.

FIG. 3 illustrates a mobile phone 300 provided with a sliding lid, said mobile phone 300 comprising a housing 301 and a lid 302 attached thereto by means of slide rails. In the transport position, the lid 302 completely covers the keyboard 303. The usage position can be chosen according to how large a part of the keys 303 the user needs. FIG. 3 illustrates a usage position where the lid 302 is completely open. The microphone 304 is located in the bottom part of the lid 302, and the loudspeaker 305 is located in the top part of the housing 301. The curved shape of the telephone 300 helps to find a comfortable usage position where the microphone 304 and the loudspeaker 305 are placed in a desired position with respect to the user's mouth and ear. The mobile phone illustrated in FIG. 3 can be called a telescopic telephone, because its length in the direction of a given (curved) dimension can be adjusted by sliding two mutually attached elements in relation to each other in the direction of said dimension.

Figure 1:
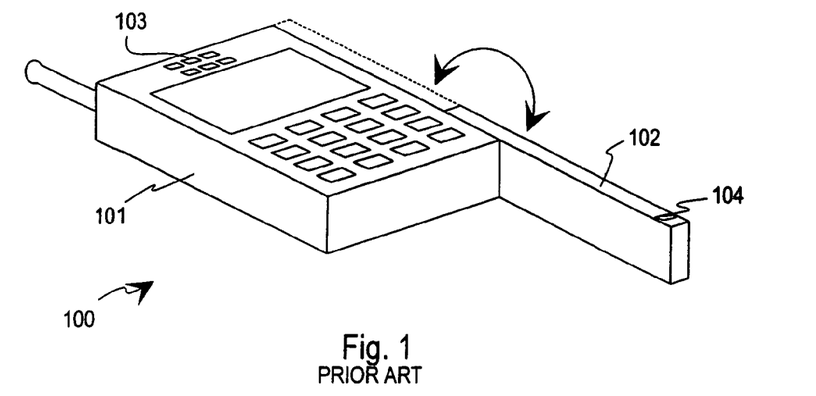
FIG. 1 illustrates a prior art mobile phone.
Figure 2:
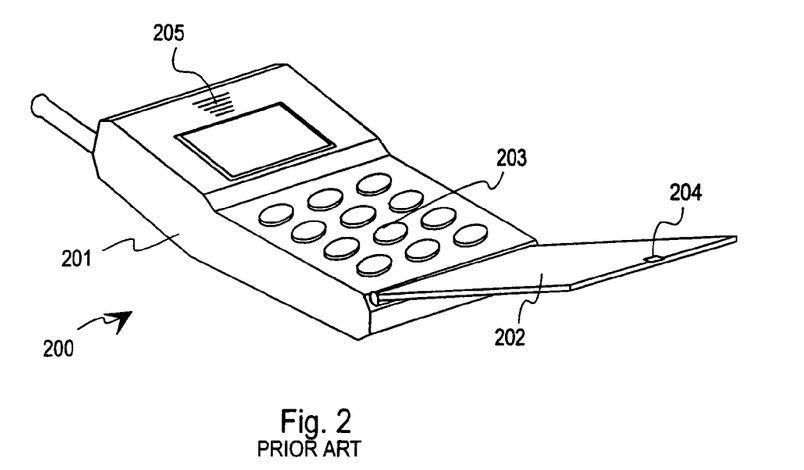
FIG. 2 illustrates another prior art mobile phone.

In the applications illustrated in FIGS. 1-3, the folding or sliding features of the telephone do not solve the problem connected to the size of the keyboard and display, but the emphasis has been to adjust the distance between the microphone and the loudspeaker.

Figure 4:
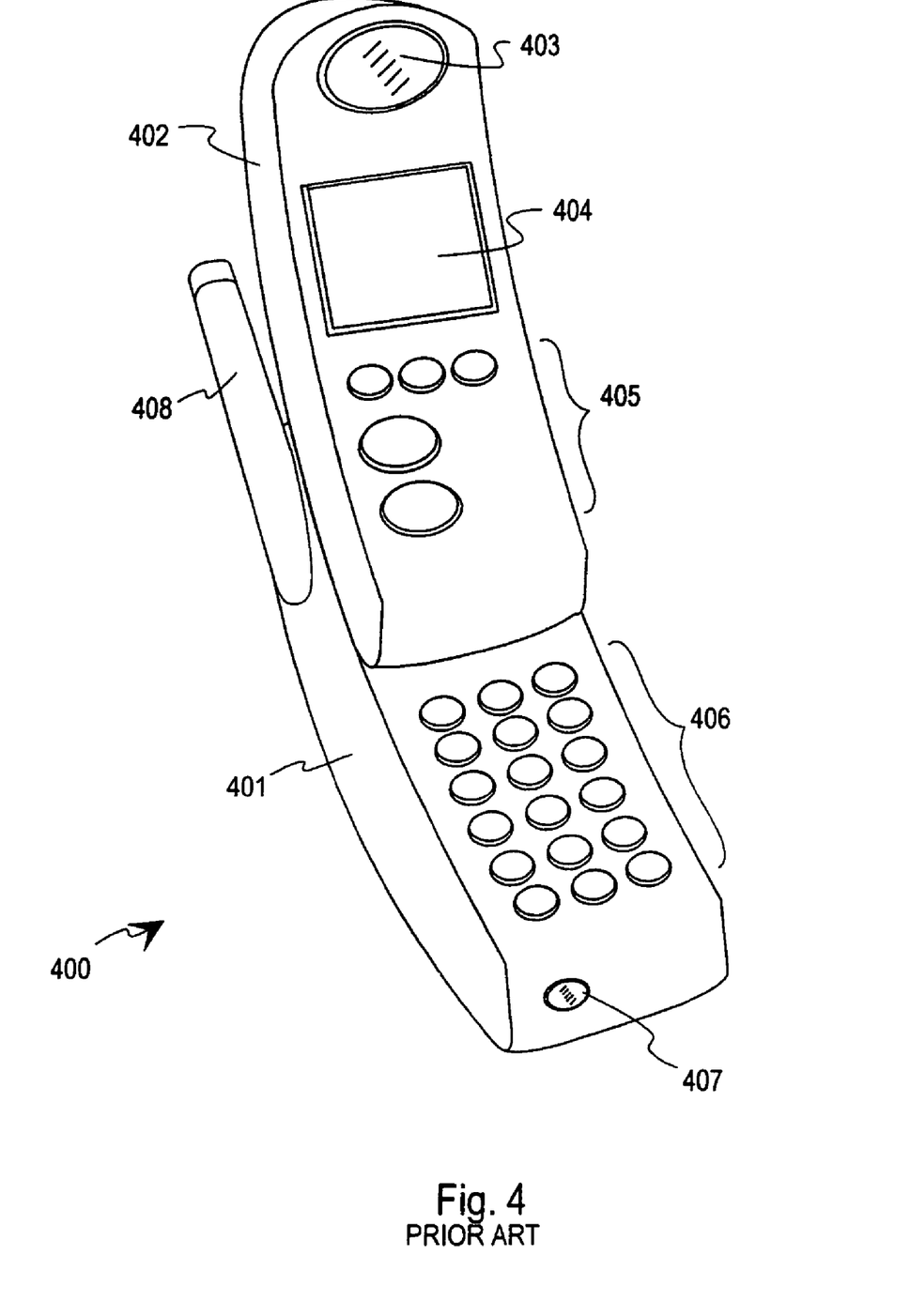
FIG. 4 illustrates a fourth prior art mobile phone.

FIG. 4 illustrates another known telescopic telephone 400, which is, introduced in the Finnish registered design application No. 285/97. The telephone comprises a housing 401 and an upper sliding part 402 including a loudspeaker 403, a display 404 and a small part of the keys 405. The housing 401 includes the rest of the keys 406, a microphone 407 and an antenna 408. For transporting the telephone, the upper sliding part 402 can be sled on top of the housing 401, so that the keyboard 406 is covered. The functional practicality of this embodiment is dubious, because the antenna is easily left inside the user's hand, or very near to the user's hand, in which case it does not work in the best possible way. In order to realise a precise and versatile display in the embodiment of FIG. 4, there is needed a large amount of leads in between the housing and the upper sliding part, which is problematic with respect to the technical applications. Usually the display 404 is provided with a glass plate or other such easily breakable part that requires a solid supporting structure around it; this requirement is difficult to fulfil in the embodiment according to FIG. 4. Moreover, there are shortcomings in the user ergonomics.

Figure 5A:
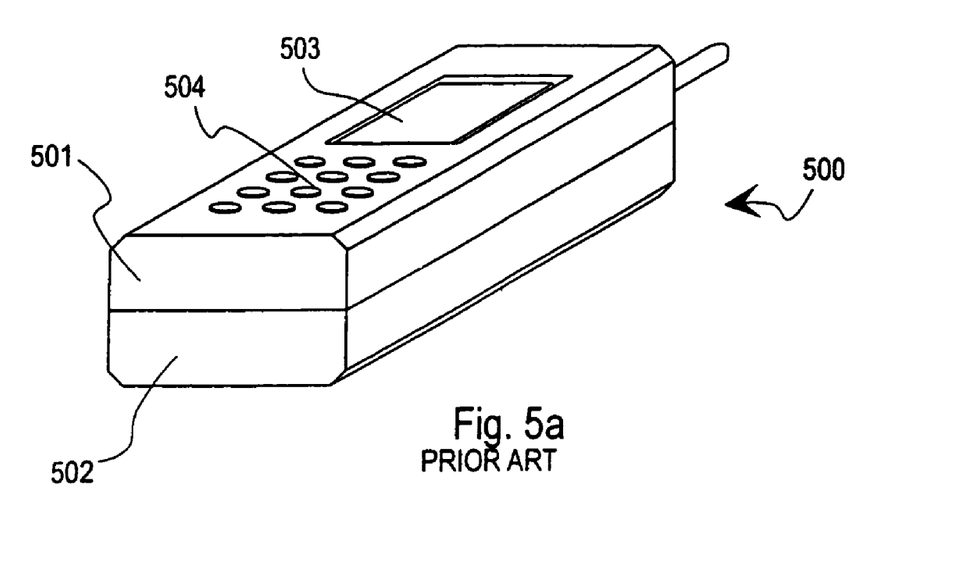
FIG. 5a illustrates a prior art mobile station.
Figure 5B:
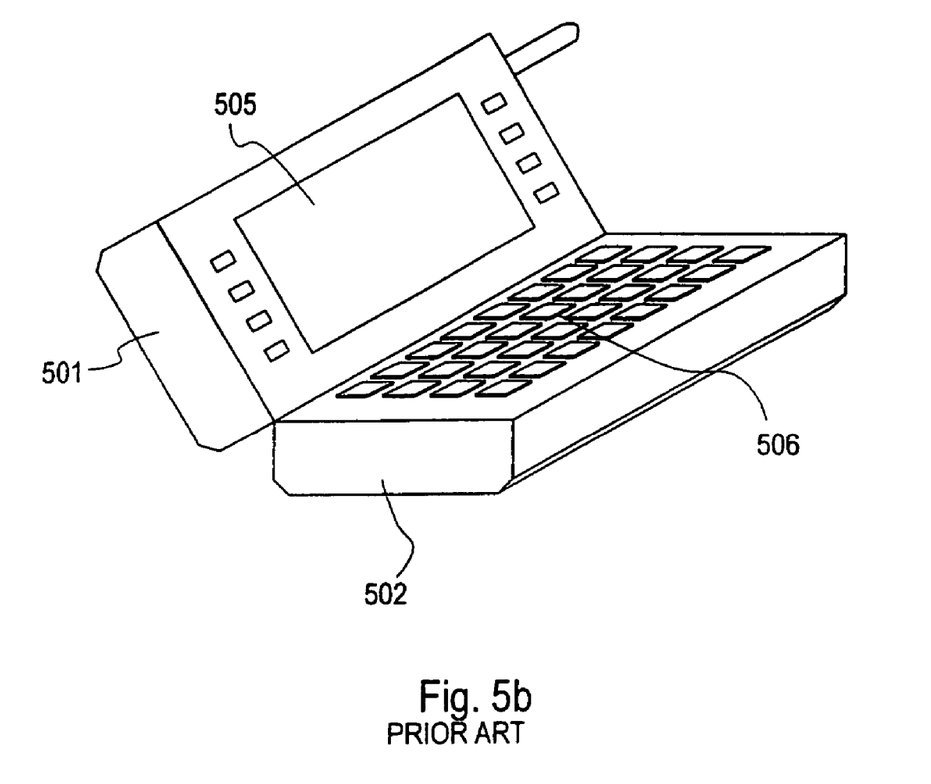
FIG. 5b illustrates the mobile station of FIG. 5a in another position.

FIGS. 5a and 5b illustrate a known method for realising a large-size user interface. A multiple-use mobile phone 500 comprises a top part 501 and a bottom part 502, which are interconnected with a hinge. The outer surface of the top part 501 constitutes a first user interface including a small-size display 503 and a number keyboard 504. The inner surfaces of the top part 501 and the bottom part 502 are shown by opening the telephone like a book, as is seen in FIG. 5b. The inner surfaces comprise another user interface provided with a large-size display and a letter keyboard 506. This application is not as such suited to the manufacturing of a mobile phone only, because in the position illustrated in FIG. 5b, the instrument 500 cannot be held on the side of the head like a telephone.

SUMMARY OF THE INVENTION

The object of the present invention is to introduce a telephone which is small in the transport position, but is still provided with a large-size user interface. Another object of the invention is that the telephone is, with respect to its mechanical structure, easy to use, durable and ergonomic. Yet another object of the invention is that in the regular usage position, the telephone antenna does not fall in the shadow of the user's hand.

The objects of the invention are achieved by locating, in the upper part of the telephone, an antenna and the radio frequency parts, among others, and in the lower part, the power source and the major part of the keys, among others. The lower part and the upper part are movably attached to each other, so that the telephone has a small-size transport position and a larger-size operating position.

The telephone according to the invention comprises a first part and a second part attached thereto, said second part being movable in relation to the first part between a first position and a second position. It is characterised in that it in the first part comprises a radio transmitter/receiver and a connected antenna, and in the second part an arrangement for fastening the battery to the second part.

The mobile phone according to the invention comprises two parts that are sliding in relation to each other, and these parts are in the present application called upper part and lower part. Said terms refer to the mutual location of the parts in the appended drawings, and they do not restrict the manufacture, treatment or usage of the mobile phone of the invention with respect to any particular direction. The upper part is also called the first part of the telephone, and the lower part is respectively called the second part. The mutual movability of the upper and the lower part is realised in a sliding fashion, so that in the transport position, the upper and the lower part are located mainly in an overlapping fashion, and for operation they can be sled to a mutual position which is most comfortable for the user in each particular case.

According to a preferred embodiment, the upper part of the telephone according to the invention comprises at least an antenna, a radio transmitter/receiver, a loudspeaker, a microphone and a display as well as part of the keys and a scanner for a smart card. The lower part comprises an arrangement for fastening a battery or a corresponding power source for the telephone, as well as the major part of the keys. The lower part is designed so that during operations, it is most natural for the user to hold the lower part of the telephone in his hand. Thus the antenna provided in the upper part is not left in the shadow of the user's hand, and not even very near to said hand. The battery attached to the lower part is a fairly heavy component, which improves the ergonomy of the telephone according to the invention in comparison with for example the telephone according to FIG. 3, where the lower part is very light. By installing the telephone components in the upper and the lower parts in an advantageous fashion, to be explained in more detail below, the number of electric contacts in between said parts is kept small, which is advantageous for usage security. In particularly, the invention enables the use of a relatively large display and keyboard even in a small mobile phone.

An additional feature according to the invention is the lock and release mechanism based on spring power that is provided between the upper and the lower part, whereby the telephone can be adjusted from the transport position to the operating position by using one hand only. This is particularly advantageous because when a call comes in, the user must react fairly rapidly in order to answer the call, and he cannot always use both hands to do this. Other advantageous additional features are attenuation connected to the opening mechanism, and the realisation of the lower part keyboard as a module—provided, in addition to the keys, also with electric connections to the upper part, to the battery, to the charging device and to other possible electric components of the lower part.

BRIEF DESCRIPTION OF THE DRAWINGS

The invention is explained in more detail below, with reference to the preferred embodiments presented by way of example and to the appended drawings, where.

In the above description of the prior art we already referred to FIGS. 1-5, and in the specification of the invention and the preferred embodiments below, we shall mainly refer to FIGS. 6a-8. Like numbers for like parts are used in the drawings.

DETAILED DESCRIPTION OF THE INVENTION

Figures 6A, 6B:
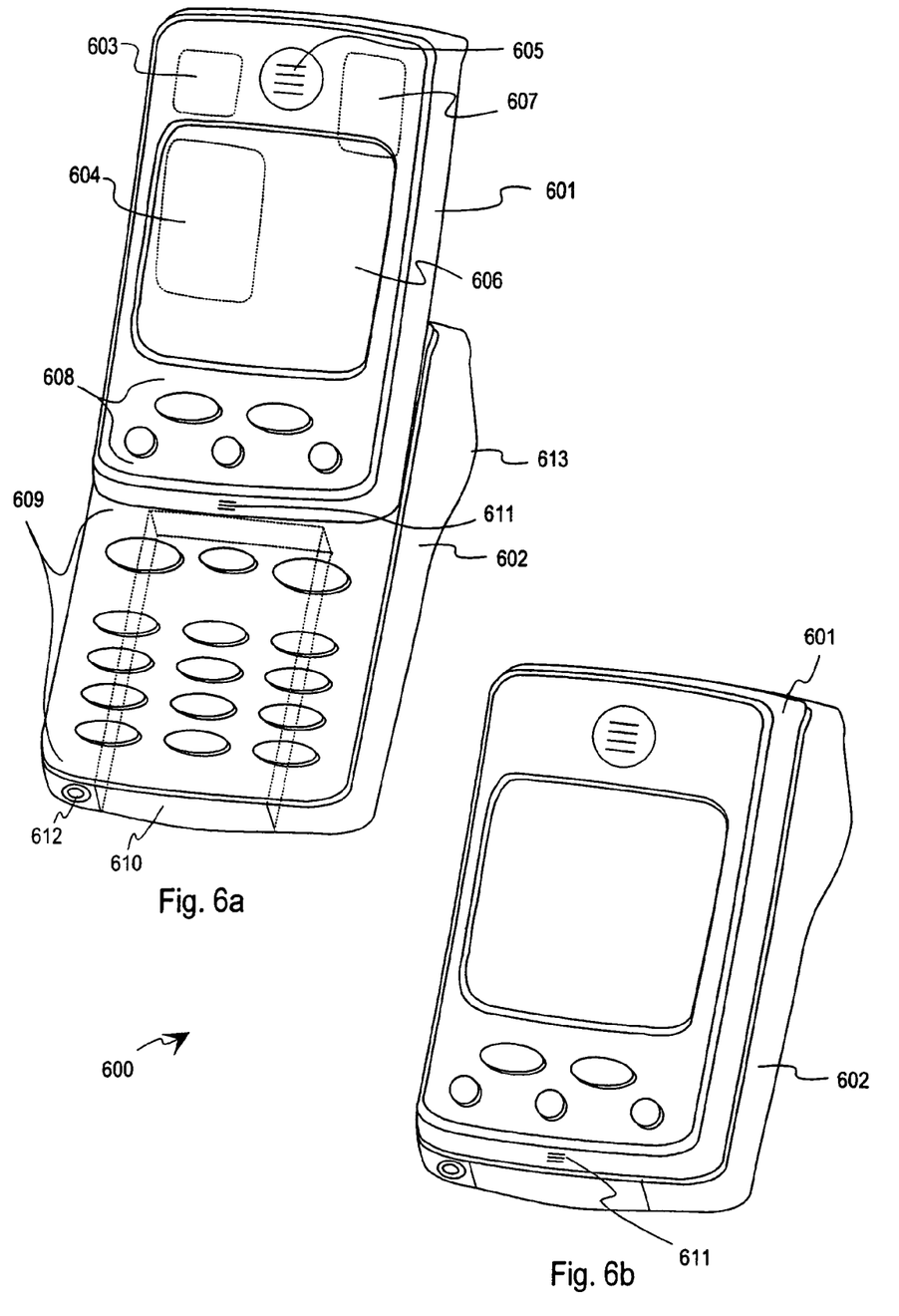
FIG. 6a illustrates a telephone of the invention in the operating position.
FIG. 6b illustrates the telephone of FIG. 6a in the transport position.

FIG. 6a is a schematical illustration of a mobile phone 600, including an upper part 601 and a lower-part 602. In the upper part 601, inside the shell, there is provided an antenna 603 for transmitting and receiving radio frequency messages, as well as a radio transmitter/receiver 604. In addition, the upper part 601 includes a loudspeaker 605, a microphone 611, a display 606, a smart card scanner 607 and a quick-action keyboard 608 including a few keys, advantageously provided with at least three and no more than ten keys; however, these numbers are not restrictive from the point of view of the invention. Typical keys of the quick-action keyboard 608 are the keys for starting and finishing a call, allow keys or corresponding browsing keys and memory management keys. The quick-action keyboard 608 may also include a known multi-usage key, such as a Navi™ key. In FIG. 6a, dotted lines are used to illustrate the contours of such parts that are not visible in the drawing, because they are located inside the telephone.

The lower part 602 of the mobile phone illustrated in FIG. 6a comprises at least a number keyboard 609 and a battery 610. Moreover, at the edge of the lower part 602, there is connected a charging device 612. Advantageously the number keyboard 609 includes at least the number keys from zero to nine. In addition, there may be included keys for controlling such operations that in a typical mobile phone usage are needed less frequently than the operations controlled by the keys of the quick-action keyboard 608, or which, for one reason or another, can only be used when the mobile phone is in the operating position. The sides of the lower part 602 of the mobile phone are designed so that a typical user gets a good grip thereof. In particular this means that the lower part is solid enough. In order to help the user in getting a good grip and in order to appropriately focus the pressure caused by the grip, the lower part may also be provided with particular grip designs 613, said designs being projections, recesses and/or non-slip features.

FIG. 6b illustrates the mobile phone of FIG. 6a in the transport position. The upper part 601 and the lower part 602 are sled, in relation to each other, so that they are located in an essentially overlapping fashion. The means for facilitating said sliding and locking in the position illustrated in FIG. 6b shall be described in more detail below. In the transport position, the keyboard remains in between the upper and the lower part and is not available for the user. On the other hand, the microphone 611 is not covered in the transport position, and thus the mobile phone 600 can be used as a telephone also in the position illustrated in FIG. 6b. Here the terms operating position and transport position must be understood as names of the positions illustrated in FIGS. 6a and 6b only—they do not in any way restrict the usage or transportation of the mobile phone 600. A minimum requirement is that even in the transport position, the mobile phone must be able to exchange signalling messages connected to the idle mode of a normal cellular radio system terminal with a given base station.

The microphone 611 could also be installed in the lower part, in which case it would in the operating position be located nearer to the user's mouth than in the structure illustrated in FIGS. 6a and 6b. However, it would then be necessary to provide one lead connection more in between the upper and the lower part, in order to lead the signal from the microphone to the radio transmitter/receiver provided in the upper part. On the basis of FIG. 6a, it is easily seen how the lower part 602 functions as the voice conductor, conducting the user's speech to the microphone, when the user holds the telephone illustrated in the drawing in the operating position, at the side of his head. Simultaneously the lower part prevents interfering noise from elsewhere from directly entering the microphone. The essential point in the location of the microphone is that it should not in any normal, anticipated usage situation be pressed against the user's cheek, so that the voice could not reach the microphone.

The use of a mobile phone according to the invention can be further facilitated By providing it with a function according to which an incoming call can be answered simply by opening the telephone from the transport position to the operating position. The technical application for implementing this function could in principle be similar to the one provided in the known Nokia 8110 mobile phone manufactured by Nokia Mobile Phones; in structure this application corresponds to the one illustrated in FIG. 3, where it is sufficient to open the sliding lid in order to answer an incoming call.

Figure 7A:
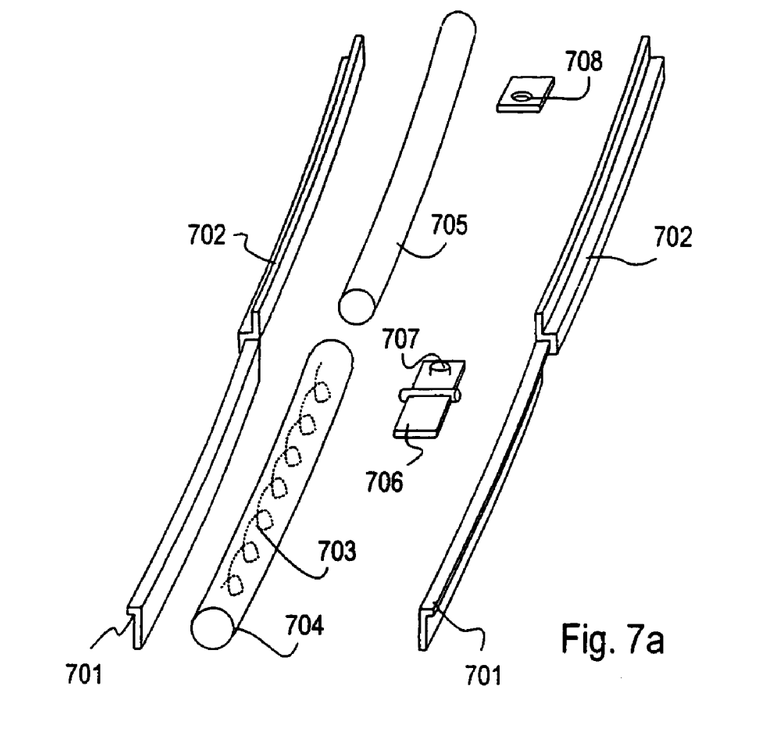
FIG. 7a illustrates a method for realising the motion between the upper and the lower part.

FIG. 7a is a schematical illustration of a preferred embodiment as regards the means for realising the mutual slide function between the upper and the lower part. The lower part is provided with slide rails 701, and the upper part is provided with matching counter-rails 702. In addition, the lower part is provided with a spring 703 surrounded by a support tube 704. The upper part is provided with a piston 705, and the piston is designed and placed so that when the telephone according to the invention is slid to the transport position, the piston 705 is pressed to inside the support tube 704, and it presses the spring 703 together in the direction of the longitudinal axis thereof. The lower part includes a trigger 706 provided with a detent pin 707 that is matched to fit in the recess 708, provided in the upper part, when the mobile phone is in the transport position. The detent pin 707 and the recess 708 together constitute a locking design, the purpose of which is to keep the mobile phone in the transport position, although the strength of the compressed spring 703 tries to push the piston 705 and thereby the whole upper part towards the operating position. When the trigger 706 is now suitably moved, the detent pin 707 slides out of the recess 708, so that the spring 703 pushes the mobile phone, by intermediation of the piston 705, to the operating position. The trigger 706 is advantageously arranged in connection with a grip design that is also otherwise natural for the user to hold. Such a grip design is for instance the bulge 613 illustrated in FIG. 6a.

In the slide rails 701, and/or in the counter-rails 702, or in some other place in the mechanical structure of the apparatus, there are easily arranged stoppers which stop the mutual motion between the upper and the lower part before the spring 703 has fully returned. Now in the operating position, the remaining compression of the spring 703 causes a strength in between the upper and the lower part, and this strength tries to maintain said parts in the operating position. There can also be presented an embodiment where a lock design connected to the trigger 706 or to another particularly designed trigger—or another known quick-release lock arrangement—locks the upper and the lower part in the operating position.

Advantageously the material of the parts illustrated in FIG. 7a is mainly polyethene or polypropylene plastic or some other generally known polymer, and the parts can be formed by injection moulding or by another known method. As regards the slide rails 701 and the counter-rails 702, at least one of these two are, however, advantageously made of metal or then they are metal-coated, because a drawback with plastic-plastic type slide parts is their high starting friction and the squeaking noise heard during the sliding. Longitudinal metal rails either in the upper or lower part also strengthen the mechanical structure of the telephone.

Figure 7B:
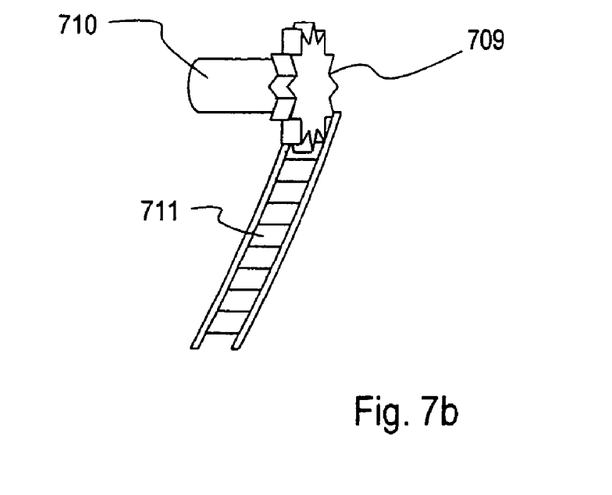
FIG. 7b illustrates a method for attenuating the motion between the upper and the lower part.

If the spring 703, as the only factor affecting the motional speed, can freely adjust the opening of the mobile phone according to the invention from the transport position to the operating position, the opening motion easily becomes too sudden and vigorous. From the point of view of usage comfort, it is advantageous to use an attenuator for softening the opening motion. The invention does not restrict the type of the attenuator employed. FIG. 7b illustrates, by way of example, an attenuator composed of a gear wheel 709 rotatably attached to the upper part and of a housing 710 surrounding the axis of said gear wheel, as well as of a gear rack 711 attached to the lower part. These are mutually arranged so that always when the upper and the lower part move in relation to each other, the gear rack 711 rotates the gear wheel 709 and the axis connected thereto and surrounded by the housing 710. In order to attenuate the motion, the housing 710 contains silicone oil, and the inertia caused by the moving of the oil tends to attenuate the rotating motion of the gear wheel 709. This attenuation is transmitted, via the gear wheel 709 and the gear rack 711, to the upper and the lower part, so that it softens the whole opening motion.

Figure 8:
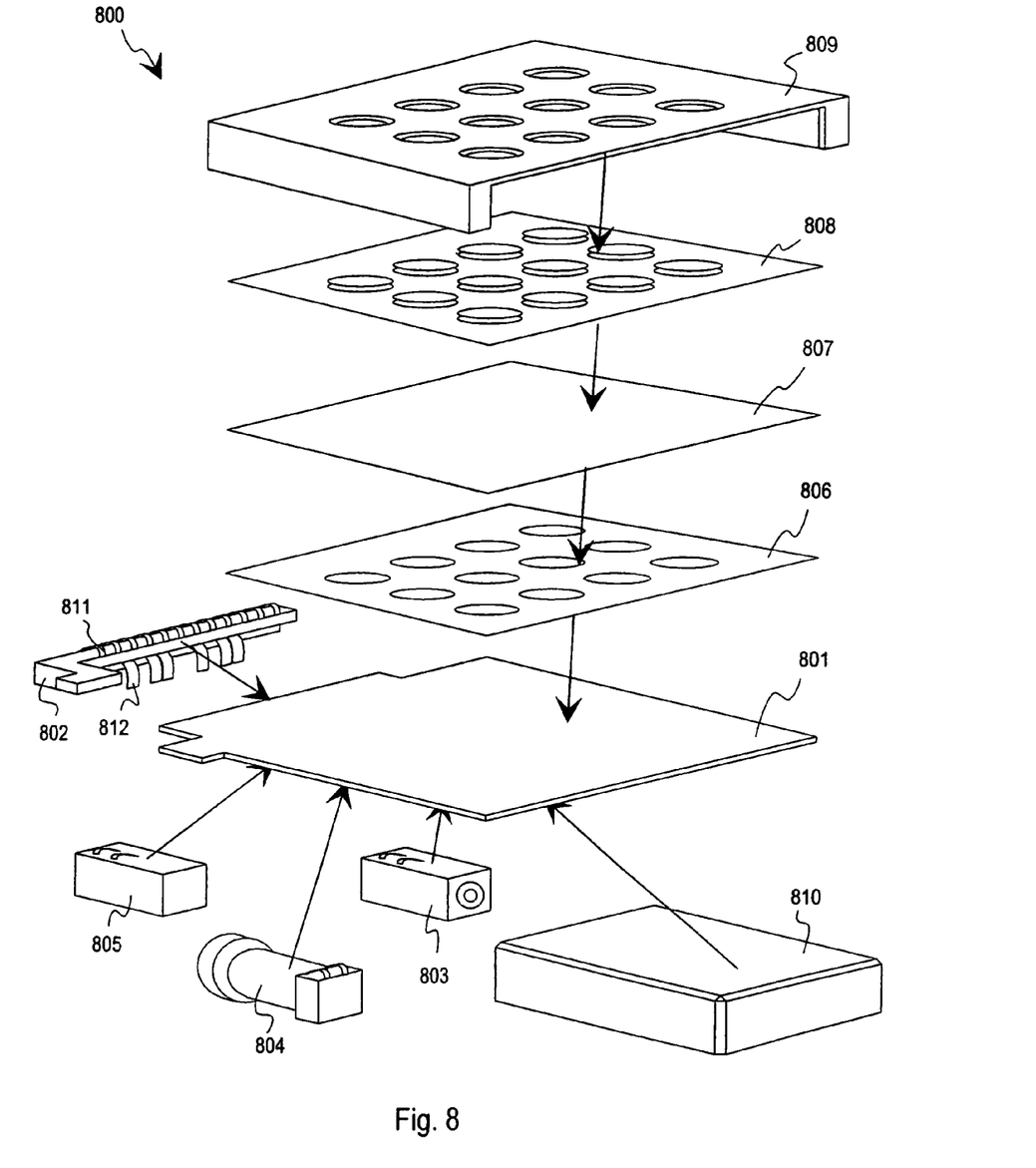
FIG. 8 illustrates a keyboard module in a telephone according to the invention.

FIG. 8 is an exploded illustration of a keyboard module 800 according to a preferred embodiment of the invention; this module enables the realisation of the lower part of the above described mobile phone in a simple fashion which also is economical for the manufacturing technique. The electric core of the keyboard module is the circuit board 801, provided with contact pads for all elements to be electrically connected thereto, connector strips for the keys, known as such, and the required strip connectors for connecting the keys. If necessary, the circuit board 801 can be a multilayer circuit board. Among the elements to be electrically connected thereto, there are at least a slide connector 802 and a charging connector 803, as well as in a preferred embodiment of the invention, also a vibrating alarm 804 and all EL control 805 for controlling the electroluminescence illumination of the keyboard. The electrically connected elements are most advantageously fixed by soldering to the respective contact pads reserved for them; for the sake of graphical clarity, these pads are not illustrated in the drawing. The number keyboard is composed by connecting, in a known fashion, a film 806 including the contact pads on top of the connector strips provided in the circuit board 801 and by placing thereon an EL layer 807 which produces the electroluminescence display and a keypad 808 made of silicone or some other elastic material. The module composed of the above enlisted parts is attached to the shell element 809 by means of snap joints and/or screws. In the created module, there can be connected a battery 810 by means of a prior art quick-release locking mechanism.

The invention does not require that the illuminated patterns of the keyboard are realised by using electroluminescence. An alternative is a prior art LED illumination, where the above mentioned EL control and EL film are replaced by a known LED control and LED illumination means.

As a counterpart for the slide connector 802, the upper part of the telephone (not illustrated in the drawing) is provided with a number of lead tracks on the surface that is placed against the lower part of the telephone. The mutual design and location of the slide connector 802 and the lead tracks is chosen so that irrespective of the fact whether the telephone is in the transport position or in the operating position or somewhere in between, each switch spring 811 of the upper surface of the slide connector touches its own lead track. In other words, when sliding the upper and the lower parts of the telephone in relation to each other, each switch spring 811 of the upper surface of the slide connector slides, along its own lead track, in the lengthwise direction of said lead track. The slide connector 802 and the above mentioned lead tracks form an electric contact in between the upper and the lower parts of the telephone. The switch springs 811 of the slide connector are advantageously made elastic, in which case the location of the slide connector is chosen so that in a closed telephone, the switch springs 811 are continuously subjected to a slight compressing force. The counteractive force caused by this elasticity then holds each switch spring compactly pressed against the respective lead track.

In FIG. 8, 12 switch springs are illustrated on the top surface of the slide Connector 802. The invention does not restrict the number of the switch springs nor the method by which they are used for transmitting various signals between the upper and the lower part of the telephone. In order to improve operational security, it is advisable to use a minimum of two separate switch springs for transmitting at least service voltage and ground potential. According to a preferred embodiment, the use of the switch springs conforms to the following table:

| Switch spring no: | Target of use |
| --- | --- |
| 1 | keyboard |
| 2 | keyboard ground |
| 3 | keyboard |
| 4 | Bsi (Battery size indicator) |
| 5 | ground |
| 6 | ground |
| 7 | BTmp (Battery Temperature) |
| 8 | keyboard lights |
| 9 | positive battery voltage |
| 10 | positive battery voltage |
| 11 | vibrating alarm |
| 12 | charging voltage |

The switch springs 812 provided at the side of the slide connector 802 are meant for forming a connection to the battery 810. Most advantageously the fastening of the battery is such that when fastened, it is pressed lightly against the switch springs 812, in which case the spring power improves the connection between the contact electrodes and the switch springs 812. The invention does not restrict the number or target of use of the switch springs provided at the side of the slide connector 812.

The keyboard module is easy to manufacture owing to its compact structure. Moreover, the keyboard is easily detached and reattached in case it is somehow damaged or it should be replaced for some other reason. The achieved structure becomes fairly thin, which is advantageous with respect to the overall measures of the telephone. In a structure according to a preferred embodiment, the battery 810 is narrower than the lower part of the telephone (cf. the battery illustrated by dotted lines in FIG. 6a), so that in the structure according to FIG. 8, on the other side of the battery there can be installed a charging connector 803, a vibrating alarm 804 and an EL control 805, and on the other side the protecting tube 704 illustrated in FIG. 7a and a spring 703 provided therein.

Obviously the above described embodiments are presented by way of example only, and they do not restrict the invention. For example, most of the mechanical parts illustrated in FIGS. 7a and 7b can be moved from one part of the telephone to another, the gear rack 711 may be installed in the upper part of the telephone and the gear wheel 709 and the housing 710 in the lower part thereof, and so fourth. An exception is the trigger 706, which is preferably always placed in the lower part, because the idea is that during regular use, the user always holds the telephone in his hand by gripping the lower part. The microphone does not necessarily have to be a fixed installation, but it may be connected to the upper or the lower part for instance by intermediation of a similar turning arm as in the prior art telephone illustrated in FIG. 1. If there is desired a display where the horizontal dimension is larger than the vertical dimension, the display can be located lengthwise in the upper part, i.e. so that the direction of the horizontal dimension of the display is the same as the sliding direction of the above described upper part with respect to the lower part. In that case it may prove to be advantageous also to place the symbols connected to the keys so that they are easily figured out by the user when he holds the telephone "horizontally" in front of his eyes. The electric circuit controlling the display can also be arranged to function so that the user may choose whether he wants to use the display in the horizontal or in the vertical mode.

The invention does not require that the motion between the upper and the lower part takes place by sliding, but it is possible to realise an embodiment where the upper and the lower part are interconnected by a hinge, in similar fashion as the housing and flap in the prior art telephone illustrated in FIG. 2. However, the sliding motion is considered preferable, because it is easier to control with one hand only. In the above specification we have suggested the use of a spiral spring as the only elastic means that produces strength in between the upper and the lower part. It is, however, obvious that any equivalent for a spring can be used for the same purpose. Instead of the above described compression spring, the spiral spring can be a draw-string, so that in the transport position of the telephone, the draw-string is pulled tighter than in the operating position.

The invention claimed is:

1. A mobile telecommunications device, comprising:
   a first body part and a second body part, of which the second body part is rotationally movable in relation to the first body part at least between a transport position, in which the second body part essentially overlaps the first body part, and an operating position,
   a loudspeaker in the first body part,
   a display in the first body part,
   quick-action keys in the first body part, and
   a keypad in the second body part;
   wherein the mobile telecommunications device is capable of exchanging at least signaling information with a telecommunications network in the transport position, and wherein the mobile telecommunications device comprises a lock and release mechanism for locking the first and second body parts into at least the transport position and for releasing the first and second body parts from at least a locked transport position, and wherein the lock and release mechanism is operable with one hand, and wherein the mobile telecommunications device further comprises a grip design and a trigger of said lock and release mechanism, said trigger being located within said grip design.

2. A mobile telecommunications device according to claim 1, comprising radio frequency parts, which are located in the first body part.

3. A mobile telecommunications device according to claim 1, comprising a microphone in the first body part.

4. A mobile telecommunications device according to claim 3, wherein the second part is adapted to act as a voice conductor for sounds propagating towards the microphone.

5. A mobile telecommunications device according to claim 1, comprising a smart card reader in the first body part.

6. A mobile telecommunications device according to claim 1, comprising a mechanical attenuator for attenuating movement between the transport position and the operating position.

7. A mobile telecommunications device according to claim 1, wherein the keypad in the second body part comprises a structural module.

8. A mobile telecommunications device according to claim 1, comprising a spring adapted to produce a spring force between the first and second body parts.

9. A mobile telecommunications device according to claim 1, wherein the lock and release mechanism is additionally adapted to lock the first and second body parts into the operating position.

10. A mobile telecommunications device according to claim 1, comprising a battery in the second body part, the battery being smaller in width than the second body part, wherein the mobile telecommunications device additionally comprises other components located at sides of the battery in the second body part.

11. An apparatus comprising:
a first body part and a second body part, of which the second body part is rotationally movable in relation to the first body part at least between a transport position, in which the second body part essentially overlaps the first body part, and an operating position,
a loudspeaker in the first body part,
a display in the first body part,
quick-action keys in the first body part, and
a keypad in the second body part;
wherein the apparatus is capable of exchanging at least signaling information with a telecommunications network in the transport position, and wherein apparatus comprises a lock and release mechanism for locking the first and second body parts into at least the transport position and for releasing the first and second body parts from at least a locked transport position, and wherein the lock and release mechanism is operable with one hand, and wherein the apparatus further comprises a grip design and a trigger of said lock and release mechanism, said trigger being located within said grip design.

* * * * *